Patented July 7, 1953

UNITED STATES PATENT OFFICE 2,644,817

1-GLYCOSIDO-5,6 DIMETHYL BENZIMIDAZOLES AND PROCESS THEREFOR

Frederick W. Holly, Cranford, Clifford H. Shunk, Westfield, Joseph J. Cahill, Princeton, and Karl Folkers, Plainfield, N. J., assignors to Merck & Co., Inc., Rahway, N. J., a corporation of New Jersey No Drawing. Application October 28, 1949, Serial No. 124,236

18 Claims. (Cl. 260—211.5)

This invention relates to new chemical compounds having growth-stimulating or vitamin-like activity and, more particularly, it relates to novel N-glycosides of 5,6-dimethylbenzimidazole and to methods by which these glycosides may be prepared.

The new and biologically active N-glycosides of 5,6-dimethylbenzimidazole may be represented by the following formula:

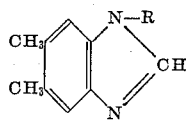

wherein R is a glycosido radical having at least 4 carbon atoms.

These new compounds are characterized by a glycosidic linkage of the type:

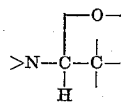

as expressed by the generic name of N-glycosides.

We have now discovered that the new and highly active N-glycosides of 5,6-dimethylbenzimidazole can be prepared from readily available raw material such as dimethylnitroaniline having the formula

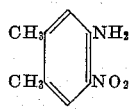

2-nitro-4,5-dimethylaniline.

In carrying out our invention herein disclosed in a preferred manner, 2-nitro-4,5-dimethylaniline is first reacted with an aldo sugar to form a compound having the formula:

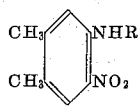

wherein R represents a glycosido radical having at least 4-carbon atoms.

While aldopentose and aldohexose are particularly desirable for this reaction other aldosugars may be used for this reaction including those having a substituent on the primary hydroxyl group. Thus the term aldosugar as herein employed is intended to include the unsubstituted aldosugars as well as those having a substituent on the primary hydroxy group.

The reaction with an aldosugar, in which one molecule of water is formed, is carried out preferably under essentially anhydrous conditions. We have found that by substituting the primary hydroxy group with a suitable group, the aldosugar is rendered soluble in an organic solvent and it is thus possible to conduct this process under anhydrous conditions. The substituents which are highly suitable for this purpose are, for example, trityl, para toluene sulfonyl, methane sulfonyl, and the like. It is usually advantageous to add a catalyst to the reaction mixture. We have obtained excellent results with the use of glacial acetic acid as a catalyst. The reaction mixture is heated to reflux, and the organic solvent, such as benzene, is distilled continuously during the condensation reaction so that water formed is removed as the benzene-water azeotrope. By varying the aldosugar, various derivatives can be prepared such as, for example, α- or β-glycosides of pyranose or furanose ring configuration. The reaction of 2-nitro-4,5-dimethylaniline with 5-trityl-D-ribofuranose may be represented as follows:

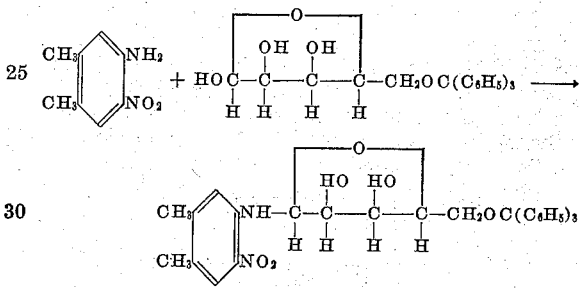

The resulting 2-nitro-4,5-dimethyl-N-(5'-trityl-D-ribofuranosido)-aniline can then be conveniently hydrogenated in the presence of a suitable catalyst such as palladium-charcoal, nickel, platinum or the like to form the corresponding 2-amino compound.

The hydrogenated compound having the formula:

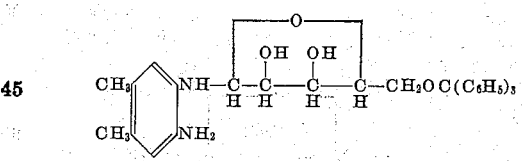

may then be converted into the desired N-glycoside of 5,6-dimethylbenzimidazole.

We have found that this conversion may be readily accomplished by the use of formic acid or certain derivatives thereof. When using a formic acid derivative such as alkyl formimino either hydrohalide as the cyclizing agent, the reaction may be carried out at room temperature and in the presence of an organic solvent. We have prepared N-glycosides of 5,6-dimethylbenzimidazole by the use of solvents such as benzene or methanol and cyclizing agents such as methyl formimino ether hydrochloride ethyl formimino ether hydrochloride and isopropyl formimino ether hydrochloride. After completion of this condensation the trityl group is removed by acid hydrolysis yielding N-glycosido-5,6-dimethylbenzimidazole.

The condensation reaction may be represented as follows:

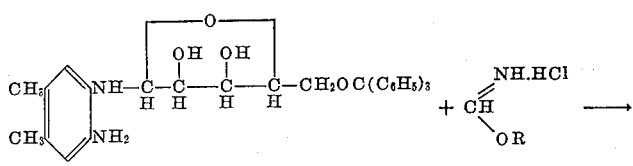

wherein R is alkyl

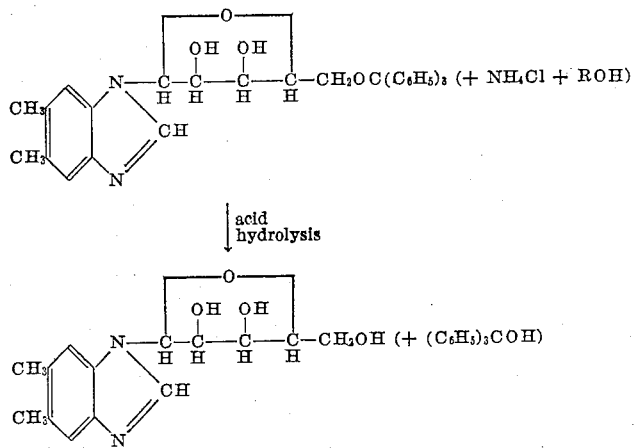

1 - α - D - ribofuranosido - 5,6 - dimethyl - benzimidazole.

Alternatively the 2-nitro-4,5-dimethyl-N-(5'-trityl-D-ribofuranosido)-aniline may be acylated prior to hydrogenation. This can be accomplished by treating the 2-nitro compound with an acylating agent in the present of an organic solvent such as pyridine to form a compound having the formula:

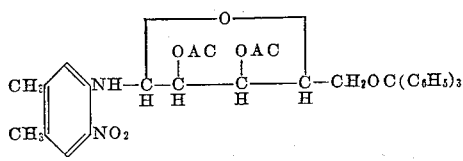

This 2-nitro compound can then be hydrogenated in the presence of a palladium catalyst to form the corresponding 2-amino compounds.

We have found that the condensation of the acylated compound with alkyl formimino ether hydrochloride followed by acid hydrolysis yielded both α- and β-ribofuranosides. 1-β-D-ribofuranosido - 5,6 - dimethylbenzimidazole having the formula:

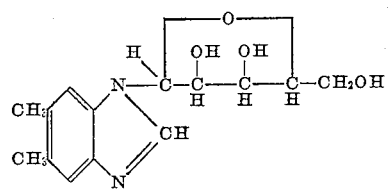

may be separated as the free base while the α-isomer is readily isolated as its picrate.

In addition to alkylformimino ether hydrohalide, other suitable reagents may be used to effect ring closure. Formic acid may be used, for example, and 1-L-arabinopyranosido-5,6-dimethylbenzimidazole is formed when formic acid and 2-amino-4,5-dimethyl-N-(L-arabinosido)-aniline in an organic solvent such as ethylene dichloride are allowed to react at room temperature for a few days.

The esters of formic acid can also be employed for the preparation of N-glycosido-5,6-dimethylbenzimidazoles. Ethyl formate, for example, may be reacted with 2-amino-4,5-dimethyl-N-(triacetyl-D-ribopyranosido)-aniline to form 1-triacetyl - D - ribopyranosido - 5,6 - dimethylbenzimidazole which is then hydrolyzed to 1-D-ribopyranosido-5,6-dimethylbenzimidazole.

1-L-arabinopyranosido-5,6-dimethylbenzimidazole and 1-D-xylopyranosido-5,6-dimethylbenzimidazole have been prepared in the same manner with the use of ethyl formate.

We have found that active N-glycosides of 5,6-dimethylbenzimidazole may be prepared by reacting 2 - amino - N - glycosido - 4,5 - dimethylaniline with a salt of dithioformic acid. We have obtained good results with a salt such as potassium dithioformate in aqueous solution. This reaction is preferably carried out at a low temperature and in the absence of strong alkalies which tend to hydrolyze the 2-amino-N-glycosido-4,5-dimethyl-aniline. We have obtained excellent yields of 2-thioformamido-4,5-dimethyl-N-glycosido-aniline which is then cyclized with a suitable reagent such as pyridine, or an alcoholic solution of an alkali metal alkoxide. In accordance with this method, we have prepared 1-D-ribopyranosido-5,6-dimethylbenzimidazole and 1-L-arabino-pyranosido - 5,6 - dimethylbenzimidazole. The reactions involved in this method may be represented as follows:

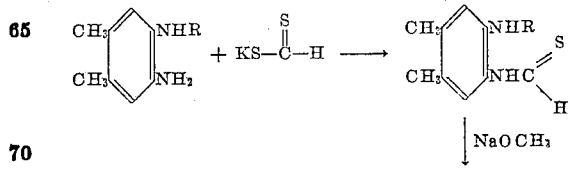

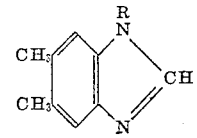

The preparation of active 5,6-dimethylbenzimidazole-N-glycosides by condensation of 2-amino - 4,5 - dimethyl - N - glycosido - aniline with formic acid or certain derivatives thereof may be represented as follows:

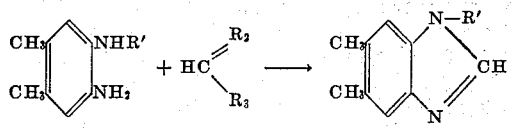

wherein R' is a glycosido group, $R_2$ is O, NH or S, $R_3$ is OH, O-alkyl, or SH. This process may be utilized to prepare four isomers derived from any aldosugar, i. e. the α- and β-forms of the furanose and pyranose ring systems. The isolation of the isomers of the N-glycosides of 5,6-dimethylbenzimidazoles may be accomplished by forming picrates of these compounds.

The conversion of the picrates to the free bases may be accomplished by conventional methods such as continuous chloroform extraction of an alkaline solution of the picrates which yields a chloroform extract containing the glycoside.

The hydrohalide salts are readily prepared by chloroform extraction of an aqueous solution of the picrate to which has been added the stoichiometrically equivalent amount of hydrohalic acid to remove picric acid and freeze-drying the residual aqueous solution to give the solid hydrohalide salt; the sulfate may be prepared by employing sulfuric acid in place of the hydrohalic acid.

The N - glycosido - 5,6 - dimethylbenzimidazole prepared in accordance with our invention possesses the animal protein factor activity to an appreciable extent and may be used to replace vitamin $B_{12}$ for certain purposes.

The following examples illustrate a method of carrying out the present invention, but it is to be understood that these examples are given by way of illustration and not of limitation.

EXAMPLE 1

*Preparation of 2-nitro-4,5-dimethyl-N-(5'-trityl-D-ribofuranosido)-aniline*

Twelve parts of 5-trityl-D-ribose prepared by the method of Bredereck, Kothnig and Berger, described in Berichte 73, 960 (1940), and 7.8 parts of 2-nitro-4,5-dimethylaniline prepared in accordance with the method of Noelting, Braun and Thermar, Berichte 34, 2242 (1901) were dissolved in about 200 parts of benzene which had been dried by distillation. To this mixture was added 1 part of glacial acetic acid. The mixture was then refluxed for 2 hours, and the water that was formed in the reaction was taken off continuously. The solution was cooled in an ice bath. A crystalline product was separated by filtration. The filtrate was concentrated in vacuo. The residue was treated with ethanol (2BA) and allowed to stand in the cold room overnight and more crystalline material separated and was filtered off. The filtrate was concentrated in vacuo to dryness. It was dissolved in a small volume of benzene and was chromatographed over 400 parts of acid-washed alumina. The column was eluted with benzene, then with ethanol giving 2-nitro-4,5-dimethyl-N-(5'-trityl-D-ribofuranosido)-aniline as a glass.

EXAMPLE 2

*Preparation of 1-α-D-ribofuranosido-5,6-dimethylbenzimidazole*

Two parts of 2-nitro-4,5-dimethyl-N-(5'-trityl-D-ribofuranosido)-aniline were hydrogenated over 1 part of palladium-activated charcoal catalyst (5% palladium) in 50 parts of methanol. After the catalyst was removed, 2.6 parts of ethyl formimino ether hydrochloride was added and the solution was refluxed for two hours. The solution was then evaporated under reduced pressure and the residue was extracted with 20 parts of benzene. Evaporation of the benzene extract gave a red oil which was heated for one hour in a solution of 10 parts of ethanol, 20 parts of water, and 3 parts of concentrated hydrochloric acid. The mixture was evaporated under reduced pressure and the residue was extracted with 30 parts of water. The aqueous solution was made alkaline to pH 10 and extracted with 4 portions of chloroform. The aqueous solution was then acidified to pH 2 with hydrochloric acid, and excess aqueous picric acid was added. Recrystallization of the product from ethanol yielded 1-α-D-ribofuranosido-5,6-dimethylbenzimidazole picrate, M. P. 217–219° C. (micro-block). Regeneration of the free base yielded 1-α-D-ribofuranosido-5,6-dimethylbenzimidazole, M. P. 198–199° C. (micro-block).

EXAMPLE 3

*Preparation of 2-nitro-4,5-dimethyl-N-(5'-trityl-2',3'-diacetyl-D-ribofuranosido)-aniline*

The 2-nitro-4,5-dimethyl-N-(5'-trityl-D-ribofuranosido)-aniline fraction eluted with ethanol, as shown in Example 1, was dissolved in about 100 parts of pyridine and the solution was cooled to 0° C. Fifty parts of acetic anhydride were then added to the cold solution. It was then placed in the cold room overnight. The next day the solution was cooled to 0° C. in an ice-salt bath and then 75 parts of ethanol were added. The solution was concentrated in vacuo to dryness. The residue was dissolved in ethanol and allowed to stand in a cold room for five days. A mixture of oil and crystals separated. This mixture was taken up in ethanol and concentrated in vacuo again. The residue was taken up in benzene-petroleum ether solution (1–1) and chromatographed over 250 parts of alumina. Elution with benzene-petroleum ether (1–1) gave 2-nitro-4,5-dimethyl - N - (5' -trityl-2',3'-diacetyl-D-ribofuranosido)-aniline as a glass.

EXAMPLE 4

*Preparation of 1-α-D-ribofuranosido-5,6-dimethylbenzimidazole and 1-α-D-ribofuranosido-5,6-dimethylbenzimidazole*

A solution of 4 parts of 2-nitro-4,5-dimethyl-N-(5' - trityl -2',3'-diacetyl-D-ribofuranosido)-aniline in 150 parts of methanol was hydrogenated over 1 part of a palladium activated charcoal catalyst (5% palladium), at 40 pounds per square inch. The yellow solution became colorless, the catalyst was removed by filtration, and the filtrate was concentrated in vacuo to an oil. The oil was dissolved in 100 parts of benzene, 1 part of ethyl formimino ether hydrochloride was added, and the mixture was stirred for twenty-five hours at 25° C. The solid was removed by filtration and the filtrate was concentrated in vacuo. The residue was dissolved in water, adjusted to pH 9 with sodium hydroxide, and extracted with chloroform. A white crystalline product separated and was recrystallized from water giving 1-β-D - ribofuranosido - 5,6 - dimethylbenzimidazole, M. P. 190–192° C. (micro-block).

A picrate of 1-β-D-ribofuranosido-5,6-dimethylbenzimidazole, M. P. 175-177° C. (micro-block), was readily prepared from an aqueous solution of the riboside by addition of an aqueous solution of picric acid.

The chloroform-water filtrate after removal of the β-riboside above was used to prepare the α-isomer. The chloroform was removed, the aqueous layer was adjusted to pH 2 with hydrochloric acid, and an aqueous solution of picric acid was added. An oily picrate was obtained. By repeated crystallizations from water-methanol and water-ethanol the crystalline picrate of 1-α-D-ribofuranosido-5,6-dimethylbenzimidazole was obtained, M. P. 219-220° C. (micro-block).

EXAMPLE 5

*Preparation of 1-α-D-ribopyranosido-5,6-dimethylbenzimidazole*

2-amino-4,5-dimethyl-N-(triacetyl-D-ribosido)-aniline, obtained as an oil by hydrogenation of 1.4 parts of the corresponding nitro-riboside, prepared by the method of Kuhn (Ber., 70 769 (1937)), was dissolved in 70 parts of dry benzene. To the solution 0.25 part of ethyl formimino ether hydrochloride was added and the mixture was stirred at about 25° for 16 hours. The solid was removed by filtration and the filtrate was concentrated in vacuo to an oil. The oil was heated for 2 hours at 80° C. with 50 parts of 5% hydrochloric acid to which sufficient methanol had been added to give a clear solution. The solution was concentrated in vacuo to an oily residue, water was added, the aqueous solution was extracted with chloroform, adjusted to pH 9 with sodium hydroxide, extracted again with chloroform, adjusted to pH 2 with hydrochloric acid, and filtered.

Isolation of the riboside from the aqueous solution was accomplished readily by formation of the less-soluble picrate. To the clear filtrate containing the riboside an aqueous solution of picric acid was added until no further precipitation occurred. The crystalline picrate was collected on a filter, washed with water, and recrystallized from methanol-water to give 1-α-D-ribopyranosido-5,6-dimethylbenzimidazole picrate, M. P. 185-188° C., soft at 161° C. (micro-block).

Anal. calcd. for $C_{20}H_{21}N_5O_{11}$: C: 47.34; H, 4.17; N, 13.80. Found: C. 46.88; H, 3.81; N, 13.75.

A combining weight was determined by ultraviolet absorption spectrum. Calcd.: 278. Found: 282.

The riboside consumed 2 moles of periodate per mole of compound, and a pyranose ring structure was therefore assigned to the compound.

EXAMPLE 6

*Preparation of 1-L-arabinopyranosido-5,6-dimethylbenzimidazole*

A solution of 17 parts of 2-nitro-4,5-dimethyl-N-(L-triacetylarabinopyranosido)-aniline, prepared by a procedure similar to that used in the preparation of the riboside in the preceding example, in 500 parts of ethyl acetate was shaken with 5 parts of 5% palladium-charcoal catalyst under a hydrogen pressure of 2-3 atmospheres to form 2-amino-4,5-dimethyl-N-(L-triacetylarabinopyranosido)-aniline. The initially yellow solution became colorless. After removal of the catalyst by filtration, the ethyl acetate was removed by distillation under reduced pressure. The last traces were removed by two distillations with toluene. After the final concentration to dryness, the colorless glassy residue was dissolved in 500 parts of dry benzene and stirred with 4-5 parts of ethyl formimino ether hydrochloride for 24 hours, to form 1-L-triacetylarabinopyranosido-5,6-dimethylbenzimidazole. Cleavage of the acetyl groups from this material was effected by refluxing for two hours with a mixture of 150 parts of alcohol and 450 parts of 1.3 N hydrochloric acid. Concentration of the solution to one-third the original volume and adjustment to pH 8-9 with sodium hydroxide precipitated an oil which was crystallized from alcohol yielding 1-L-arabinopyranosido-5,6-dimethylbenzimidazole, M. P. 269-270° C. (micro-block); a picrate was prepared, M. P. 210-212° C. (micro-block).

EXAMPLE 7

*Preparation of 1-D-xylopyranosido-5,6-dimethylbenzimidazole*

Twenty-five parts of 2-nitro-4,5-dimethylaniline, 22.6 parts of D-xylose, and 1.5 parts of ammonium chloride were added to 200 parts of absolute ethanol and the mixture was refluxed for two hours. The resulting dark red solution was concentrated under reduced pressure, the residue was triturated with benzene, and the filtrate was chromatographed using 500 parts of alumina. Elution with ethanol at 60° C. gave 2-nitro-4,5-dimethylaniline. 2-nitro-4,5-dimethyl-N-(D-xylosido)-aniline was then obtained as an oil by elution with a mixture of water-pyridine-methanol (1-1-2) followed by concentration under reduced pressure.

The above oil was dissolved in 200 parts of pyridine containing 20 parts of acetic anhydride. The solution was cooled in an ice bath and an additional 60 parts of acetic anhydride were added. The resulting solution was kept overnight at 0° C. and then the excess acetic anhydride was decomposed by the addition of 100 parts of ethanol. The solution was evaporated under reduced pressure and the oil was dissolved in benzene. The benzene solution was extracted with two portions of water, dried over sodium sulfate, and filtered. The solution was then chromatographed using 1000 parts of acid-washed alumina. The material was eluted with benzene until the eluate was almost colorless. Evaporation of the benzene gave 2-nitro-4,5-dimethyl-N-(triacetyl-D-xylosido)-aniline as an amber oil.

Two parts of the above triacetyl compound were reduced in 30 parts of ethyl acetate using 1.3 parts of palladium-charcoal (5% palladium) catalyst. The catalyst was filtered off and the solvent was distilled under reduced pressure. Two portions of xylene were added and evaporated under reduced pressure to remove the ethyl acetate. The residual oil was dissolved in 40 parts of xylene and 5 parts of ethyl formate and the solution was refluxed in a nitrogen atmosphere for eighteen hours. The solvent was evaporated under reduced pressure and the resulting oil was dissolved in 10 parts of ethanol; 3 parts of concentrated hydrochloric acid and 20 parts of water were added. The solution, after heating on the steam bath for two hours, was evaporated under reduced pressure to one-half volume, made alkaline with dilute sodium hydroxide, and partitioned between chloroform and water. The aqueous layer was extracted with chloroform and then acidified with dilute hydrochloric acid. The addition of aqueous picric acid gave a gummy precipitate. The mixture was warmed on the steam bath and filtered giving a clear solution.

The solid that separated on cooling was collected and recrystallized from water giving small yellow prisms that were recrystallized from water yielding 1-D-xylopyranosido-5,6-dimethylbenzimidazole picrate, M. P. 120–122° C. (micro-block).

Anal. calcd. for $C_{20}H_{21}N_5O_{11}$: C, 47.34; H, 4.17. Found: C, 47.46; H, 4.20.

EXAMPLE 8

*Preparation of 1-α-D-ribopyranosido-5,6-dimethylbenzimidazole*

Two parts of 2-nitro-4,5-dimethyl-N-(triacetyl-D-ribosido)-aniline were reduced in 25 parts of ethyl formate over 1 part of palladium-activated charcoal (5% palladium) catalyst. The catalyst was removed and the filtrate was heated in a steel bomb at 150° C. for eighteen hours in a nitrogen atmosphere. The resulting dark solution was evaporated under reduced pressure and the residual oil was heated on the steam bath with 10 parts of ethanol, 20 parts of water, and 3 parts of concentrated hydrochloric acid for two hours. The mixture was partitioned between chloroform and water and the aqueous layer was evaporated under reduced pressure to remove the excess hydrochloric acid. The residue was dissolved in 20 parts of water, made alkaline with sodium hydroxide, extracted with four portions of chloroform and then acidified with dilute hydrochloric acid. Excess aqueous picric acid was then added and the oil that precipitated was redissolved by heating. After filtering, the solution was allowed to cool slowly. The solid that separated was collected and recrystallized from aqueous methanol giving 1-α-D-ribopyranosido-5,6-dimethylbenzimidazole picrate, melting point about 187° C. with softening at 126° (micro-block).

EXAMPLE 9

*Preparation of 1-L-arabinopyranosido-5,6-dimethylbenzimidazole*

A solution of 2-amino-4,5-dimethyl-N-(triacetyl-L-arabinosido)-aniline, obtained from 2 parts of the corresponding nitro-arabinoside, in 35 parts of xylene and 15 parts of ethyl formate was refluxed under nitrogen for twenty-four hours. The reaction mixture was concentrated in vacuo and the residue was hydrolyzed by refluxing with 21 parts of 5% hydrochloric acid and 4 parts of ethanol for two hours. The solution was concentrated to half-volume, extracted with chloroform, adjusted to pH 9 with sodium hydroxide, and then extracted again with chloroform. A nearly colorless solution was obtained which was adjusted to pH 2 with hydrochloric acid; an aqueous solution of picric acid was added. The picrate obtained was recrystallized from methanol, giving 1-L-arabinopyranosido-5,6-dimethylbenzimidazole picrate, M. P. 211–213° C. (micro-block).

This compound exhibits animal protein factor activity at a level of 0.5 milligram/rat/day.

EXAMPLE 10

*Preparation of 1-L-arabinopyranosido-5,6-dimethylbenzimidazole picrate*

A solution of 3.5 parts of 2-nitro-4,5-dimethyl-N-(L-triacetylarabinosido)-aniline in 90 parts of benzene was shaken with 1.5 parts of 5% palladium-charcoal catalyst until no more hydrogen was absorbed. After removal of the catalyst by filtration and concentration of the filtrate to dryness under reduced pressure, the residue, consisting of 2-amino-4,5-dimethyl-N-L-triacetyl-arabinosido-aniline, was dried by distillation with ethylene dichloride. The residue, dissolved in 15 parts of ethylene dichloride, was treated with 1.5 parts of drierite and 0.5 part of 98–100% formic acid. The vessel was sealed with a drying tube and the contents aged for three days. The resulting solution, containing 2-formylamino-4,5-dimethyl-N-L-arabinosidoaniline, after separation of the solid material by filtration, was concentrated to dryness under reduced pressure, with a bath temperature of 30–35°. Benzene was added twice and removed by distillation. The brown oily residue was leached with dry ether. Evaporation of the ether left an amorphous solid containing sticky material. This was again leached with ether. Decolorization of the ether solution with activated charcoal, filtration, and concentration of the filtrate to dryness left a light colored amorphous solid. From a solution of two parts of this amorphous solid in 100 parts of dry toluene, solvent was distilled slowly over a period of three and one-half hours to effect ring closure. The toluene level was maintained by continuous addition of fresh, dry toluene. Removal of the toluene under reduced pressure left a brown, glassy residue, which was refluxed for two hours with a mixture of 15 parts of alcohol and 45 parts of 1.3 N HCl. The black solution was filtered, decolorized to some extent with activated charcoal, and then extracted repeatedly with chloroform. The resulting straw-colored solution was cooled in an ice bath and adjusted to pH 10–11 with 6 N NaOH. The solution, clarified by centrifuging, was decanted and extracted four times with chloroform to remove any 5,6-dimethylbenzimidazole. The cooled aqueous solution was then adjusted to pH 2–3 with hydrochloric acid, and treated with saturated aqueous picric acid. The picrate of 1-L-arabinopyranosido-5,6-dimethylbenzimidazole was collected on a filter and purified by one recrystallization from methanol, M. P. 210–212° C. (micro-block).

EXAMPLE 11

*Preparation of 2-thioformamido-4,5-dimethyl-N-(triacetyl-L-arabinosido)-aniline*

2-amino-4,5-dimethyl-N-(triacetyl-L-arabinosido)-aniline, obtained from 2 parts of the corresponding nitro-arabinoside, was dissolved in 25 parts of ethanol, and the solution was added to a cold solution of 8 parts of potassium dithioformate in a mixture of 25 parts of water, 10 parts of ethanol, and 1 part of 2.5 N hydrochloric acid. A clear solution resulted and was kept at 0° C. for three days. During this time a crystalline product separated. The product was recrystallized from methanol-water and then from ether-petroleum ether giving 2-thioformamido-4,5-dimethyl-N-(triacetyl-L-arabinosido)-aniline, M. P. 134–136° C. (micro-block).

Anal. calcd. for $C_{20}H_{20}N_2O_7S$: N, 6.39. Found: N, 6.72.

EXAMPLE 12

*Preparation of 1-L-arabinopyranosido-5,6-dimethylbenzimidazole*

To a solution of 4 parts of 2-thioformamido-4,5-dimethyl-N-(triacetyl-L-arabinosido)-aniline in 400 parts of ethanol-benzene (1–1) was added 2.5 parts of sodium methoxide, and the mixture was refluxed under nitrogen for two hours. The solution was concentrated in vacuo, the residue was dissolved in water, adjusted to pH 2 with hydrochloric acid, and extracted with chloroform. The arabinoside was isolated readily from the clear aqueous solution by addition of an aqueous solution of picric acid. The crystalline picrate obtained was recrystallized from methanol giving 1-L-arabinopyranosido-5,6-dimethylbenzimidazole picrate, M. P. 210–212° C. (micro-block).

Anal. calcd. for $C_{20}H_{21}N_5O_{11}$: C, 47.34; H, 4.17. Found: C, 47.32; H, 4.18.

Combining weight (by ultraviolet absorption spectrum) Calcd. 278. Found: 280.

A pyranose ring structure was assigned on the basis of the consumption of two molar equivalents of periodate.

EXAMPLE 13

*Preparation of 2-thioformamido-4,5-dimethyl-N-(triacetylribosido)-aniline*

Two and three-tenths parts of 2-nitro-4,5-dimethyl-N-(triacetylribosido)-aniline were dissolved in 50 parts of ethyl acetate and reduced over 1.5 parts of palladium-activated charcoal (5% palladium) catalyst. After removal of the catalyst, the solvent was evaporated under reduced pressure and the resulting oil was dissolved in 25 parts of ethanol. The solution was then cooled in an ice bath and added to a solution (0° C.) of 8.0 parts of potassium dithioformate in 25 parts of water. An additional 10 parts of ethanol was added to give a solution which was kept at 0° C. for two days. The yellow crystalline precipitate that separated was collected and recrystallized by dissolving it in warm ethanol and diluting the resulting solution with an equal volume of water. After the mixture was allowed to stand overnight at room temperature, crystals of 2-thioformamido-4,5-dimethyl-N-(triacetylribosido)-aniline were obtained, M. P. 95–98° C. (micro-block).

Anal. calcd. for $C_{20}H_{26}N_2O_7S$: C, 54.78; H, 5.98; N, 6.39. Found: C, 54.51; H, 6.07; N, 6.61

EXAMPLE 14

*Preparation of 1-β-D-ribopyranosido-5,6-dimethylbenzimidazole*

To 35 parts of absolute ethanol was added 0.03 part of sodium and when this had dissolved 0.6 part of 2-thioformamido-4,5-dimethyl-N-(triacetylribosido)-aniline were added. The solution was refluxed for two and three-quarters hours in an atmosphere of nitrogen and then the alcohol was evaporated under reduced pressure. The resulting solution was partitioned between water and chloroform and the aqueous layer was washed with three portions of chloroform. Aqueous picric acid was then added and the precipitate was collected and dried under reduced pressure giving a crude picrate which was recrystallized from ethanol yielding 1-β-D-ribopyranosido-5,6-dimethylbenzimidazole picrate, M. P. 208–210° C. (micro-block). The pyranoside structure was proven by a periodate titration in which two moles of periodate were consumed.

Anal. calc'd. for $C_{20}H_{21}N_5O_{11}$: C, 47.34; H, 4.17; N, 13.80. Found: C, 46.94; H, 3.97; N, 14.01.

EXAMPLE 15

*Preparation of 1-β-D-glucopyranosido-5,6-dimethylbenzimidazole*

Ten parts of 2-nitro-4,5-dimethyl-N-(tetraacetyl-D-glucosido)-aniline (Kuhn and Ströbele, Ber. 70, 777 (1937)) were hydrogenated in 200 parts of benzene over 5 parts of a 2% palladium-Darco catalyst. The catalyst was removed by filtration and to the filtrate 9 parts of isopropyl formimino ether hydrochloride were added. The mixture was shaken for seventeen hours at 25° C. A white solid was removed by filtration and was washed with benzene. The filtrate was concentrated in vacuo to an oil which was refluxed in a mixture of 20 parts of ethanol, 40 parts of water, and 6 parts of concentrated hydrochloric acid for twenty hours. The solution was concentrated in vacuo to a small volume and was extracted twice with chloroform. The aqueous layer was adjusted to pH 10 with aqueous sodium hydroxide and was extracted three times with chloroform. The aqueous layer was adjusted to pH 1–2 with concentrated hydrochloric acid; a saturated aqueous solution of picric acid was added and a crystalline picrate of 1-β-D-glucopyranosido-5,6-dimethylbenzimidazole was obtained. The product was recrystallized from a mixture of methanol and water to give 1-β-D-glucopyranosido-5,6-dimethylbenzimidazole picrate, M. P. 232–235° C., with a transition from plates to needles at about 195° (micro-block).

Modifications may be made in carrying out the present invention without departing from the spirit and scope thereof, and the invention is to be limited only by the appended claims.

We claim:

1. 1-glycosido-5,6-dimethylbenzimidazole having the formula:

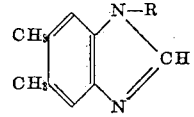

wherein R represents a glycosido radical having at least 4-carbon atoms.

2. 1-α-D-ribofuranosido-5,6-dimethylbenzimidazole.

3. 1-β-D-ribofuranosido-5,6-dimethylbenzimidazole.

4. 1-β-D-ribopyranosido-5,6-dimethylbenzimidazole.

5. 1-L-arabinopyranosido-5,6-dimethylbenzimidazole.

6. 1-pentosido-5,6-dimethylbenzimidazole.

7. 1-hexosido-5,6-dimethylbenzimidazole.

8. 1-β-D-glucopyranosido-5,6-dimethylbenzimidazole.

9. The process which comprises reacting a glycosido compound having the formula

wherein R is a glycosido radical having at least 4 carbon atoms, with a member selected from the group consisting of formic acid esters and alkyl formimino ether hydrohalides to produce a glycosido compound having the formula

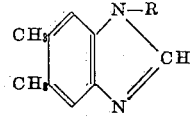

10. The process which comprises reacting 2-amino-4,5-dimethyl-N-glycosido-aniline with an alkyl formimino ether hydrohalide to produce the corresponding N-glycoside of 5,6-dimethylbenzimidazole.

11. The process which comprises reacting 2- amino-4,5-dimethyl-N-glycosido-aniline with a formic acid ester to produce the corresponding N-glycoside of 5,6-dimethylbenzimidazole.

12. The process which comprises reacting 2-amino-4,5-dimethyl-N-(5'-trityl-D-ribofuranosido)aniline with ethyl formimino ether hydrochloride, hydrolyzing the resulting reaction product by heating with an acid, and recovering 1-α-D-ribofuranosido-5,6-dimethylbenzimidazole from the hydrolysate.

13. The process which comprises reacting 2-amino-4,5-dimethyl-N-(5'-trityl-2',3'-diacetyl-D-ribofuranosido)-aniline with ethyl formimino ether hydrochloride, hydrolyzing the resulting reaction product by heating with acid to produce a mixture of 1-β-D-ribofuranosido-5,6-dimethylbenzimidazole and 1-α-D-ribofuranosido-5,6-dimethylbenzimidazole, dissolving said mixture in water, crystallizing 1-β-D-ribofuranosido-5,6-dimethylbenzimidazole from said aqueous solution, and recovering 1-α-D-ribofuranosido-5,6-dimethylbenzimidazole from the mother liquors.

14. The process which comprises reacting 2-amino-4,5-dimethyl-N-(triacetyl-D-ribosido)-aniline with ethyl formimino ether hydrochloride, hydrolyzing the resulting reaction product by heating with acid, and recovering the 1-α-D-ribopyranosido-5,6-dimethylbenzimidazole from the hydrolysate.

15. The process which comprises reacting 2-amino-4,5-dimethyl-N-(L-triacetylarabinopyranosido)-aniline with ethyl formimino ether hydrochloride, hydrolyzing the resulting reaction product by heating with acid, and recovering 1-L-arabinopyranosido-5,6-dimethylbenzimidazole from the hydrolysate.

16. The process which comprises reacting 2-amino-4,5-dimethyl-N-(triacetyl-D-xylosido)-aniline with ethyl formate, hydrolyzing the resulting reaction product by heating with acid, and recovering 1-D-xylopyranosido-5,6-dimethylbenzimidazole from the hydrolysate.

17. The process which comprises reacting 2-amino-4,5-dimethyl-N-(triacetyl-D-ribosido)-aniline with ethyl formate, hydrolyzing the resulting reaction product by heating with acid, and recovering 1-α-D-ribopyranosido-5,6-dimethylbenzimidazole from the hydrolysate.

18. The process which comprises reacting 2-amino-4,5-dimethyl-N-(triacetyl-L-arabinosido)-aniline with ethyl formate, hydrolyzing the resulting reaction product by heating with acid, and recovering 1-L-arabinopyranosido-5,6-dimethylbenzimidazole from the hydrolysate.

FREDERICK W. HOLLY.
CLIFFORD H. SHUNK.
JOSEPH J. CAHILL.
KARL FOLKERS.

References Cited in the file of this patent

UNITED STATES PATENTS

| Number | Name | Date |
| --- | --- | --- |
| 2,522,854 | Brink et al. | Sept. 19, 1950 |

OTHER REFERENCES

Karrer et al.: Helv. Chim. Acta 18 (1935), pages 70, 75, 77, 1438, 1439.

Pigman: "Carbohydrate Chemistry," 1948, page 378.

Wright: JACS, vol. 71 (1949), pages 2035–2037.